(12) United States Patent

Wang et al.

(10) Patent No.: US 8,643,961 B2
(45) Date of Patent: Feb. 4, 2014

(54) OPTICAL DEVICE

(75) Inventors: Tien-Hsiung Wang, Taoyuan Hsien (TW); Tsang-Hsing Ku, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 402 days.

(21) Appl. No.: 12/982,766

(22) Filed: Dec. 30, 2010

(65) Prior Publication Data

US 2011/0216426 A1 Sep. 8, 2011

(30) Foreign Application Priority Data

Mar. 5, 2010 (TW) ................................. 99106534 A

(51) Int. Cl.
*G02B 7/02* (2006.01)
*G02B 15/14* (2006.01)
(52) U.S. Cl.
USPC ............ 359/823; 359/818; 359/702; 359/703
(58) Field of Classification Search
USPC .................. 359/811, 813, 815, 819–824, 826
See application file for complete search history.

(56) References Cited

U.S. PATENT DOCUMENTS

2009/0040479 A1* 2/2009 Liao et al. ..................... 353/101

* cited by examiner

*Primary Examiner* — Thomas K Pham
*Assistant Examiner* — Brandi Thomas

(57) ABSTRACT

An optical device includes a lens module, a case structure and an optical adjusting mechanism. The optical adjusting mechanism includes a first adjusting member, a second adjusting member and an elastic element. The first adjusting member includes a first interference transmission structure. The second adjusting member is movably connected with the case structure, and includes a second interference transmission structure. In response to the movement of the lens module, the elastic element elastically urges against the second adjusting member so that the second adjusting member is movable within a predetermined distance range, and the second interference transmission structure presses against and engages with the first interference transmission structure. Once the second adjusting member is moved, the first adjusting member is synchronously moved so that optical parameters of the lens module are adjusted through the first adjusting member.

19 Claims, 3 Drawing Sheets

OPTICAL DEVICE

CLAIM OF PRIORITY

This application claims priority to Taiwanese Patent Application No. 099106534 filed on Mar. 5, 2010.

FIELD OF THE INVENTION

The present invention relates to an optical device, and more particularly to an optical device with reduced cost, saved layout space and precisely-adjustable optical parameters. The present invention also relates to an optical adjusting mechanism of the optical device.

BACKGROUND OF THE INVENTION

Generally, an optical device such as a projector (e.g. an ultra-short focus projector) has a lens module, which is fixed on a holder and sheltered by a case structure. During the process of installing the lens module on the holder or transporting or using the optical device, the position of the lens module may be slightly shifted because of the external force. Even if a position shift is very tiny, it is difficult to adaptively adjust the optical parameters (e.g. focal length or magnification) of the lens module by the optical adjusting mechanism.

For avoiding generation of any tiny position shift of the lens module, a fixed lens module is disclosed. Since the fixed lens module fails to be adjusted, the precision of the molds and associated components should comply with a stringent standard. In this situation, the material cost and the fabricating cost are increased, and the fabricating process becomes complicated. Moreover, since the flange-back distance of the fixed lens module is unchanged, the projecting performance of the optical device with such fixed lens module is usually unsatisfied in some circumstances. Since the volume of the lens module of the current ultra-short focus projector is very bulky, the use of a focus-adjusting ring to adjust the focal length will adversely affect the appearance of the optical device.

Recently, the focal length of the optical device can be adjusted by using a remotely-controlled motor to adjust the lens module. This method, however, still has some drawbacks. For example, since the components are not cost-effective, the fabricating cost of the overall optical device is increased. In addition, due to the restriction of mechanical inertial properties, it is difficult to accurately adjust the focal length by the remote controller.

Therefore, there is a need of providing an optical device and an optical adjusting mechanism so as to obviate the drawbacks encountered from the prior art.

SUMMARY OF THE INVENTION

It is an object of the present invention to provide an optical device and an optical adjusting mechanism in order to avoid the drawbacks of using the fixed lens module (e.g. stringent precision demand, high cost, complicated configurations and unchanged flange-back distance) or the drawbacks of using the motor.

Another object of the present invention provides an optical device and an optical adjusting mechanism with reduced fabricating cost, simplified configurations and pleasing appearance. In addition, the demand on the precision of the optical device is reduced, and the optical parameters of the lens module could be precisely and simply adjusted.

In accordance with an aspect of the present invention, there is provided an optical device. The optical device includes a lens module, a case structure and an optical adjusting mechanism. The case structure partially shelters the lens module. The optical adjusting mechanism includes a first adjusting member, a second adjusting member and an elastic element. The first adjusting member is disposed on the lens module, and includes a first interference transmission structure. The second adjusting member is movably connected with the case structure, and includes a second interference transmission structure. The elastic element is arranged between the case structure and the second adjusting member. In response to the movement of the lens module, the elastic element elastically urges against the second adjusting member so that the second adjusting member is movable within a predetermined distance range, and the second interference transmission structure of the second adjusting member presses against and engages with the first interference transmission structure of the first adjusting member. Once the second adjusting member is moved, the first adjusting member is synchronously moved so that optical parameters of the lens module are adjusted through the first adjusting member.

In accordance with another aspect of the present invention, there is provided an optical adjusting mechanism of an optical device. The optical device includes a case structure and a lens module. The case structure partially shelters the lens module. The optical adjusting mechanism includes a first adjusting member, a second adjusting member and an elastic element. The first adjusting member is disposed on the lens module, and includes a first interference transmission structure. The second adjusting member is movably connected with the case structure, and includes a second interference transmission structure. The elastic element is arranged between the case structure and the second adjusting member. In response to the movement of the lens module, the elastic element elastically urges against the second adjusting member so that the second adjusting member is movable within a predetermined distance range, and the second interference transmission structure of the second adjusting member presses against and engages with the first interference transmission structure of the first adjusting member. Once the second adjusting member is moved, the first adjusting member is synchronously moved so that optical parameters of the lens module are adjusted through the first adjusting member.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
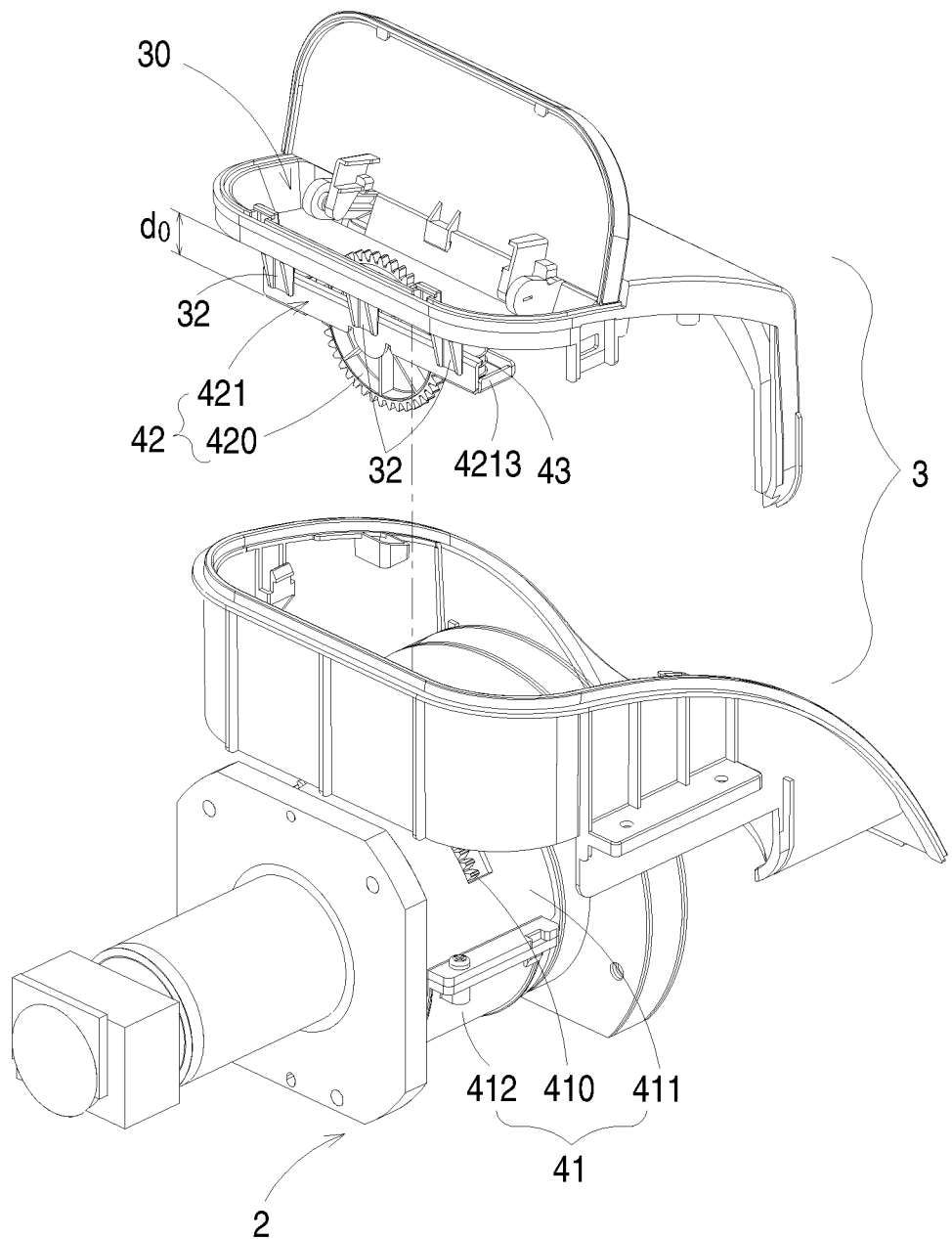
FIG. 1 is a schematic view illustrating an optical device according to an embodiment of the present invention.

FIG. 1 is a schematic view illustrating an optical device according to an embodiment of the present invention. An example of the optical device 1 is a projector such as an ultra-short focus projector. As shown in FIG. 1, the optical device 1 comprises a lens module 2, a case structure 3 and an optical adjusting mechanism 4 (see FIG. 3). In this embodiment, the lens module 2 is partially shielded by the case structure 3. The optical adjusting mechanism 4 comprises a first adjusting member 41, a second adjusting member 42 and an elastic element 43. The first adjusting member 41 is disposed on the lens module 2, and comprises a first interference transmission structure 410. The second adjusting member 42 is movably connected with the case structure 3, and comprises a second interference transmission structure 420. The elastic element 43 is arranged between the case structure 3 and the second adjusting member 42. In response to the movement of the lens module 2, the elastic element 43 elastically urges against the second adjusting member 42 so that the second adjusting member 42 is movable within a predetermined distance range d0. Due to the elastic element 43, the second interference transmission structure 420 of the second adjusting member 42 presses against and engages with the first interference transmission structure 410 of the first adjusting member 41. Once the second adjusting member 42 is moved, the first adjusting member 41 is synchronously moved so that the optical parameters of the lens module 2 are adjusted through the first adjusting member 41.

Figure 2:
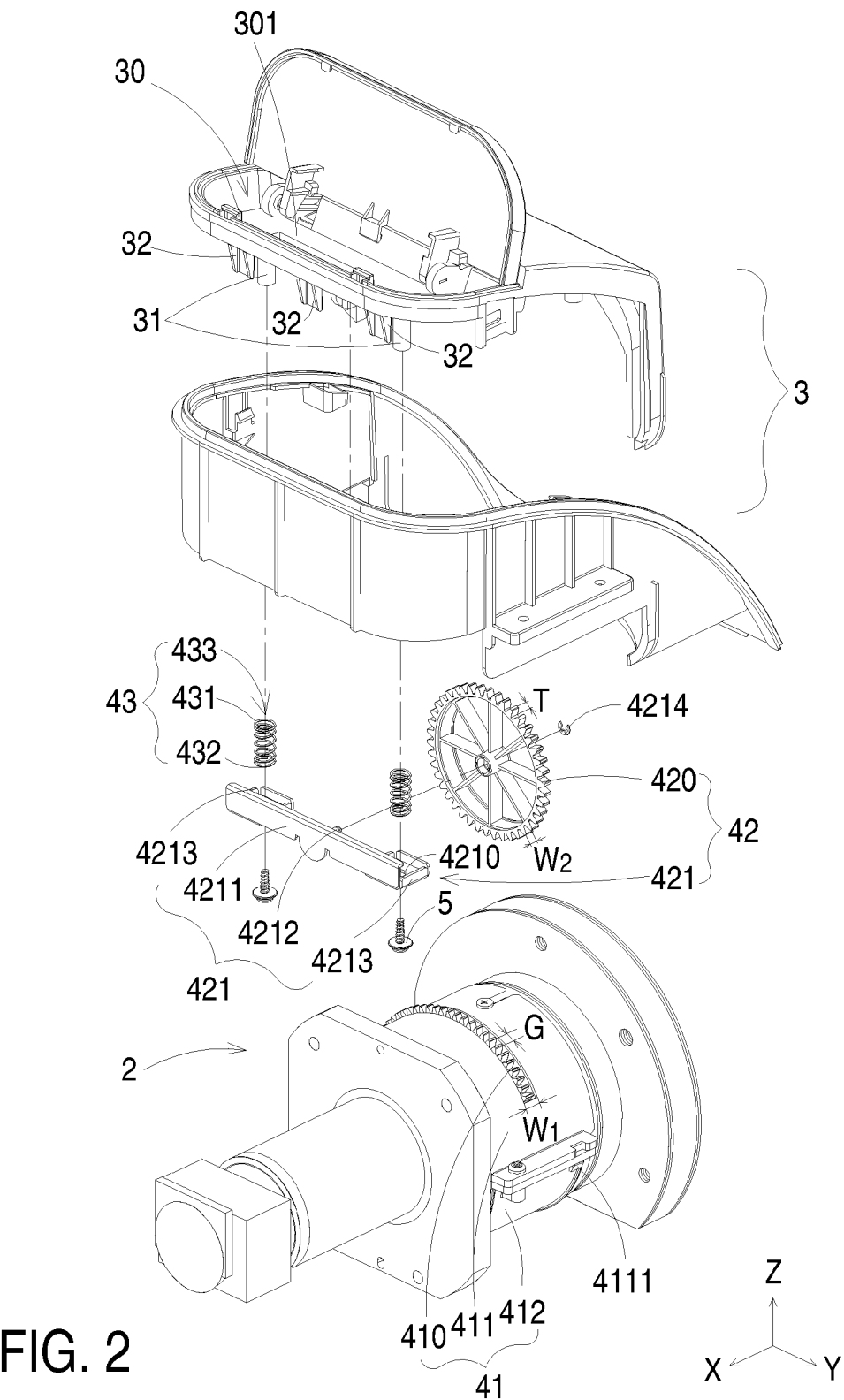
FIG. 2 is a schematic exploded view illustrating the optical device as shown in FIG. 1.

Hereinafter, the detailed configurations of the optical device 1 will be illustrated with reference to FIGS. 1 and 2. FIG. 2 is a schematic exploded view illustrating the optical device as shown in FIG. 1. As shown in FIG. 2, the first adjusting member 41 of the optical adjusting mechanism 4 comprises the first interference transmission structure 410, a first lens-fixing ring 411 and a second lens-fixing ring 412. In this embodiment, the first lens-fixing ring 411 is substantially a semi-circular shell that partially shelters the upper portion of the lens module 2. In addition, a hooking element 4111 is extended from an edge of the first lens-fixing ring 411. Similarly, the second lens-fixing ring 412 is substantially a semi-circular shell, which is arranged under the first lens-fixing ring 411. The second lens-fixing ring 412 has a perforation (not shown) corresponding to the hooking element 4111 of the first lens-fixing ring 411. When the hooking element 4111 is penetrated through the perforation, the first lens-fixing ring 411 and the second lens-fixing ring 412 are initially connected with each other. Moreover, in the assistance of a fastening element (e.g. a screw), the first lens-fixing ring 411 and the second lens-fixing ring 412 are securely connected with each other. As such, the first lens-fixing ring 411 and the second lens-fixing ring 412 are combined together to be a circular shell that is coaxial with the lens module 2 (e.g. along the X direction). In this situation, the lens module 2 is partially clamped between the first lens-fixing ring 411 and the second lens-fixing ring 412. Upon rotation of the first lens-fixing ring 411 and the second lens-fixing ring 412, the inner threads of the first lens-fixing ring 411 and the second lens-fixing ring 412 are engaged with and moved along a guiding groove (not shown) of the lens module 2, so that the optical parameters (e.g. focal length or magnification) of the lens module 2 are adjustable. In this embodiment, the optical parameter is the focal length.

An example of the first interference transmission structure 410 is a rack. The first interference transmission structure 410 is substantially parallel with the YZ plane, which is perpendicular to the axial direction X of the lens module 2. In addition, the first interference transmission structure 410 is arranged along the surface of the first lens-fixing ring 411, and slightly protruded out of the first lens-fixing ring 411. In this embodiment, the first interference transmission structure 410 (e.g. a rack) has a width W1 and a tooth pitch G.

Please refer to FIG. 2 again. The second adjusting member 42 comprises the second interference transmission structure 420 and an auxiliary fixing element 421. In this embodiment, the auxiliary fixing element 421 comprises a slab 4211, a shaft 4212 and at least one extension part 4213. The shaft 4212 is substantially arranged in the middle of the slab 4211, and perpendicular to a surface of the slab 4211. In addition, the second interference transmission structure 420 is sheathed around the shaft 4212. In this embodiment, two extension parts 4213 are respectively extended from both ends of the slab 4211. The extension parts 4213 and the shaft 4212 are at the same side with respect to the slab 4211. An example of the extension part 4213 is a recess. In addition, an opening 4210 runs through the bottom of the extension part 4213 (i.e. the recess). It is preferred that the slab 4211, the shaft 4212 and the extension part 4213 of the auxiliary fixing element 421 are integrally formed.

An example of the second interference transmission structure 420 is a gear, which is sheathed around the shaft 4212 of the auxiliary fixing element 421 and arranged between the two extension parts 4213. By fixing a clamping ring 4214 on the shaft 4212, the second interference transmission structure 420 is clamped between the clamping ring 4214 and the slab 4211 in order to prevent detachment of the second interference transmission structure 420 from the auxiliary fixing element 421 upon rotation. In other words, the second interference transmission structure 420 is supported by the auxiliary fixing element 421 (see FIG. 1). As shown in FIG. 2, the second interference transmission structure 420 (e.g. a gear) has a width W2 and a tooth thickness T. The width W2 of the second interference transmission structure 420 is smaller than the width W1 of the first interference transmission structure 410. The tooth thickness T of the second interference transmission structure 420 is slightly smaller than the tooth pitch G of the first interference transmission structure 410. Even if there is a tiny difference between the tooth thickness T of the second interference transmission structure 420 and the tooth pitch G of the first interference transmission structure 410, the first interference transmission structure 410 and the second interference transmission structure 420 can be effectively engaged with each other.

An example of the elastic element 43 of the optical adjusting mechanism 4 is a helical spring. The number of the elastic element 43 may be varied according to the practical requirements. In this embodiment, the optical adjusting mechanism 4 has two elastic elements 43. The elastic element 43 comprises a first terminal 431, a second terminal 432 and a channel 433. The first terminal 431 and the second terminal 432 are arranged at opposite ends of the channel 433.

Please refer to FIG. 2 again. The case structure 3 of the optical device 3 may at least partially shelter the lens module 2. The case structure 3 has an operating space 30. A slot 301 is formed within the operating space 30. In particular, the slot 301 is formed in the bottom surface of the operating space 30, and in communication with the operating space 30. After the second adjusting member 42 and the case structure 3 are combined together, the second interference transmission structure 420 is partially penetrated through the slot 301. Moreover, the case structure 3 further comprises at least one post 31 and at least one partition plate 32. For example, the post 31 and the partition plate 32 are extended from the bottom surface of the operating space 30 toward the lens module 2. It is preferred that the extending directions of the post 31 and the partition plate 32 are perpendicular to the axial direction of the lens module 2. In other words, the post 31 and the partition plate 32 are extended along the Z direction. In this embodiment, the case structure 3 has two posts 31. These two posts 31 are respectively arranged on two opposite ends of the slot 301. The posts 31 are cylindrical. The diameter of the post 31 is determined according to the opening 4210 of the extension part 4213 of the auxiliary fixing element 421 of the second adjusting member 42. In addition, the external diameter of the post 31 is smaller than the channel 433 of the elastic element 43. It is noted than the number and shape of the post 31 may be varied according to the practical requirements. In this embodiment, the case structure 3 has three partition plates 32, which are arranged in a line. It is noted than the number and size of the partition plate 32 may be varied according to the practical requirements.

Please refer to FIGS. 1 and 2 again. The first adjusting member 41 of the optical adjusting mechanism 4 is disposed on the lens module 41. The second adjusting member 42 and the elastic element 43 are connected with the case structure 3. Hereinafter, a process of connecting the second adjusting member 42 and the elastic element 43 with the case structure 3 will be illustrated. Firstly, the post 31 of the case structure 3 is inserted into and accommodated within the channel 433 of a corresponding elastic element 43. Then, the second interference transmission structure 420 is fixed on the auxiliary fixing element 421. Then, the post 31 of the case structure 3 is aligned with the opening 4210 of the extension part 4213. Then, a fastening element 5 is penetrated through the opening 4210 of the extension part 4213 and tightened in the post 31. Meanwhile, the fastening element 5 presses against the bottom of the extension part 4213 of the auxiliary fixing element 421 in order to prevent detachment of the second adjusting member 42 from the case structure 3. Moreover, the use of the fastening element 5 may limit the lowermost position of the second adjusting member 42 along the extending direction of the post 31 (i.e. the Z direction). In this situation, the second interference transmission structure 420 is partially penetrated through the slot 301 of the operating space 30 of the case structure 3 so that the second interference transmission structure 420 is partially accommodated within the operating space 30. In addition, the slab 4211 of the auxiliary fixing element 421 presses against the partition plate 32 of the case structure 3. Since the diameter of the opening 4210 is fitted with the post 31, after the post 31 is penetrated through the opening 4210, the second adjusting member 42 is movable with respect to the post 31 along the Z direction. In other words, the second adjusting member 42 is movable within the predetermined distance range d0 (i.e. between the uppermost and lowermost positions along the extending direction of the post 31) with respect to the bottom surface of the operating space 30.

Please refer to FIG. 1 again. Since the elastic element 43 is sheathed around the post 31 of the case structure 3 and the opening 4210 of the auxiliary fixing element 421 is aligned with the post 31 of the case structure 3, after the second adjusting member 42 is movably connected with the case structure 3 by the fastening element 5, the elastic element 43 is supported by the extension part 4213 of the auxiliary fixing element 421 and arranged between the case structure 3 and the second adjusting member 42. In this situation, the first terminal 431 of the elastic element 43 is in contact with the case structure 43, and the second terminal 432 of the elastic element 43 is in contact with the extension part 4213 of the auxiliary fixing element 421. Since the extension part 4213 is a recess, the second terminal 432 of the elastic element 43 is accommodated within the extension part 4213. Moreover, when the second adjusting member 42 is moved within the predetermined distance range d0, the elastic element 43 provides an elastic force to the second adjusting member 42.

Figure 3:
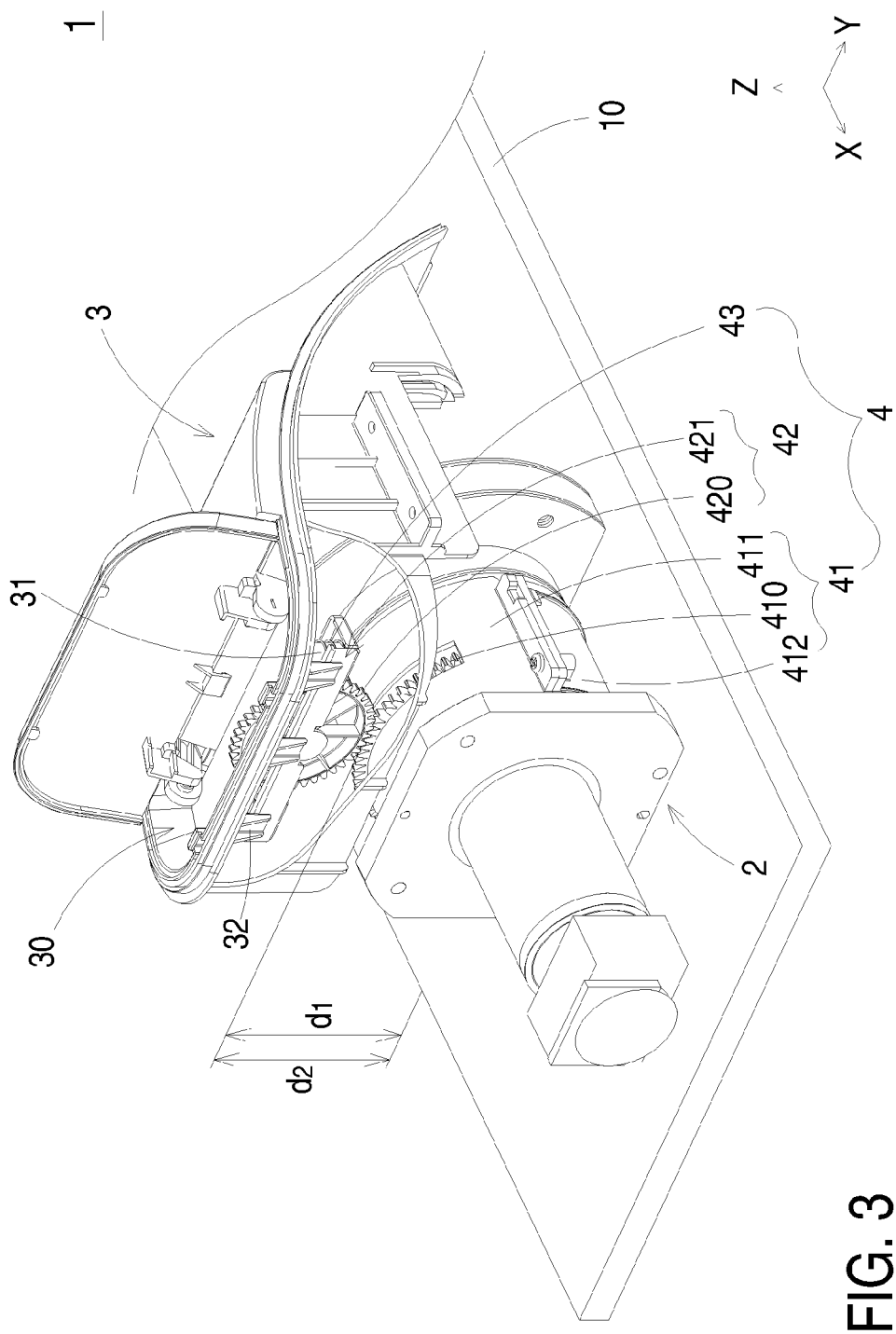
FIG. 3 is a schematic assembled view illustrating the optical device as shown in FIG. 2.

FIG. 3 is a schematic assembled view illustrating the optical device as shown in FIG. 2. Please refer to FIGS. 1, 2 and 3. The lens module 2 is supported on the holder 10 of the optical device 10. The case structure is connected with the second adjusting member 42 and the elastic element 43 and partially shelters the lens module 2. The second interference transmission structure 420 of the second adjusting member 42 is aligned with the first interference transmission structure 410 of the first adjusting member 41. As shown in FIG. 3, the lowermost position of the second interference transmission structure 420 of the second adjusting member 42 is separated from the holder 10 along the extending direction of the post 31 (i.e. the Z direction) by a minimum distance d2. In addition, once the lens module 2 is shifted toward the holder 10 along the Z direction, the first interference transmission structure 410 of the first adjusting member 41 is separated from the holder 10 by a maximum distance d1. After the optical device 1 is assembled, the minimum distance d2 is not greater than the maximum distance d1. In other words, when the second interference transmission structure 420 of the second adjusting member 42 is in the lowermost position along the Z direction, the second interference transmission structure 420 is contacted with the first interference transmission structure 410. Since the second interference transmission structure 420 is a gear with a tooth thickness T slightly smaller than the tooth pitch G of the rack (i.e. the first interference transmission structure 410, the first interference transmission structure 410 and the second interference transmission structure 420 are engaged with each other.

As known, after the lens module 2 is installed on the holder 10, a fine-tuning operation should be done. In addition, during the process of transporting or using the optical device, the rocking may cause tiny shift (e.g. several micrometers) of the lens module 2 with respect to the holder 10.

For example, when the lens module 2 is shifted upward with respect to the holder 10 along the Z direction, the first interference transmission structure 410 of the first adjusting member 41 will press against the second interference transmission structure 420 of the second adjusting member 42. Since the second interference transmission structure 420 is sheathed around the shaft 4212 of the auxiliary fixing element 421, the upward shift of the second interference transmission structure 420 will cause the whole auxiliary fixing element 421 to move upwardly. Meanwhile, the elastic element 43 arranged between the auxiliary fixing element 421 and the case structure 3 is pressed by the extension part 4213 so that a counterforce facing the lens module 2 is generated by the elastic element 43. In response to the counterforce of the elastic element 43, the second interference transmission structure 420 effectively presses against the first interference transmission structure 410. In other words, in response to the movement of the lens module 2, the elastic element 43 elastically urges against the second adjusting member 42 so that the second adjusting member 42 is movable within a predetermined distance range d0. Due to the elastic element 43, the second interference transmission structure 420 of the second adjusting member 42 presses against the first interference transmission structure 410 of the first adjusting member 41. Since the slab 4211 of the auxiliary fixing element 421 presses against the partition plate 32 of the case structure 3, when the second adjusting member 42 is movable within the predetermined distance range d0 in response to movement of the lens module 2, the partition plate 32 may assist in limiting the second adjusting member 42 to move along the X direction (i.e. the axial direction of the lens module 2). In this situation, the second adjusting member 42 can be stably moved within the predetermined distance range d0 along the Z direction.

Whereas, when the lens module 2 is shifted downward with respect to the holder 10 along the Z direction, since the maximum distance d1 between the first interference transmission structure 410 and the holder 10 is not smaller than the minimum distance d2 between the lowermost position of the second interference transmission structure 420 and the holder 10 along the Z direction, the first interference transmission structure 410 and the second interference transmission structure 420 can be still engaged with each other.

In other words, once the lens module 2 is shifted along the Z direction, the elastic element 43 elastically urges against the second adjusting member 42 so that the second adjusting member 42 is movable within the predetermined distance range d0. Due to the elastic element 43, the second interference transmission structure 420 is moved toward the lens module 2 to press against and stably engage with the first interference transmission structure 410. That is, the elastic element 43 provides a buffering effect without influencing the engagement between the second interference transmission structure 420 and the first interference transmission structure 410.

Moreover, the tooth thickness T of the second interference transmission structure 420 is slightly smaller than the tooth pitch G of the first interference transmission structure 410. Even if the lens module 2 has a tiny position shift along the Y direction, the gear of the second interference transmission structure 420 can be still engaged with the rack of the first interference transmission structure 410. In addition, the width W1 of the first interference transmission structure 410 is greater than the width W2 of the second interference transmission structure 420. Even if the lens module 2 has a tiny position shift along the X direction, the second interference transmission structure 420 is still in the moving range of the first interference transmission structure 410. In other words, the width W1 and the tooth pitch G of the first interference transmission structure 410 and the width W2 and the tooth thickness T of the second interference transmission structure 420 should be elaborately determined in order to prevent detachment of the second interference transmission structure 420 from the first interference transmission structure 410.

As previously described, during the process of installing the lens module 2 on the holder 10 or transporting or using the optical device 1, the lens module 2 may be shifted by several micrometers along the X, Y or Z direction. Since the second adjusting member 42 is movable with respect to the case structure 3 and the elastic element 43 is arranged between the case structure 3 and the second adjusting member 42, a stable engagement between the second interference transmission structure 420 and the first interference transmission structure 410 is continuously rendered. After the operating space 30 of the case structure 3 is opened, the user may adjust the second interference transmission structure 420 and thus adjust the first interference transmission structure 410. By adjusting the first interference transmission structure 410, the first lens-fixing ring 411 and the second lens-fixing ring 412 are rotated so as to adjust the optical parameters of the lens module 2.

It is noted that, however, those skilled in the art will readily observe that numerous modifications and alterations may be made while retaining the teachings of the invention. For example, in replace of the helical spring, a C-shaped elastic sheet may used as the elastic element. The first terminal of the elastic sheet is fixed on the case structure by screwing, and the second terminal of the elastic sheet is connected with the extension part of the auxiliary fixing element. The elastic sheet elastically urges against the second adjusting member so that the second adjusting member is movable within a predetermined distance range. Due to the elastic sheet, the second interference transmission structure is moved toward the lens module to press against and stably engage with the first interference transmission structure.

In the above embodiment, the first interference transmission structure and the second interference transmission structure are illustrated by referring to a rack and a gear, respectively. Nevertheless, the rack and the gear may be replaced by any other matched helical structures. In other words, any components with the interference transmission efficacy may be used as the first interference transmission structure and the second interference transmission structure.

In the above embodiment, the two elastic elements are arranged on both ends of the auxiliary fixing element of the second adjusting member for facilitating the second adjusting member to stably move within the predetermined distance range d0 along the Z direction. Alternatively, the elastic element may be directly connected with the second interference transmission structure and the case structure while omitting the auxiliary fixing element. The number of the elastic element may be varied according to the practical requirements. For example, a single elastic sheet is used as the elastic element. The first terminal and the second terminal of the elastic element are respectively fixed on the case structure and the auxiliary fixing element so that the elastic sheet may provide buffering efficacy. For enhancing the buffering efficacy, the number of the elastic element may be increased. Any component that is arranged between the case structure and the second adjusting member for providing buffering efficacy could be used as the elastic element in order to render engagement between the second interference transmission structure and the first interference transmission structure.

From the above description, the optical adjusting mechanism of the optical device is capable of precisely adjusting the optical parameters without the needs of using the conventional fixed lens module. In the optical adjusting mechanism, the elastic element is arranged between the second adjusting member and the case structure to provide buffering efficacy. By elaborately determining the width and the tooth pitch of the first interference transmission structure and the width and the tooth thickness of the second interference transmission structure, the second interference transmission structure fails to be detached from the first interference transmission structure. Even if a tiny shift occurs during process of installing the lens module or transporting or using the optical device, the elastic element elastically urges against the second adjusting member so that the second adjusting member is movable within a predetermined distance range. In this situation, the second interference transmission structure is moved toward the lens module to press against and stably engage with the first interference transmission structure. Since the fixed lens module is not used in the present invention, the demand on the precision of assembling the lens module is no long too stringent, and the fabricating cost of the optical device is reduced. In other word, the problem of causing the projecting performance from the fixed flange-back distance in the prior art will be eliminated.

Moreover, in a case that the optical adjusting mechanism is used in a small-sized optical device (e.g. an ultra-short focus projector), the operating space of the case structure is usually narrow. Since the first interference transmission structure of the first adjusting member is transmitted to move by the second interference transmission structure of the second adjusting member, the optical parameters of the lens module are indirectly adjusted. Since the optical parameters of the lens module are not directly adjusted through the first adjusting member, the overall volume of the optical device is not increased. In this situation, the appearance of the optical device is not adversely affected, and the optical device could meet the small-sized requirement.

Moreover, since the optical adjusting mechanism of the present invention has simplified configurations and is cost-effective, the cost of the components and the whole optical device will be reduced and the assembling process will be simplified when compared with the conventional technology of using a motor to adjust the optical parameters. By manually rotating the second interference transmission structure of the second adjusting member, the first interference transmission structure is synchronously rotated to rotate the first lens-fixing ring and the second lens-fixing ring so that the optical parameters of the lens module are correspondingly adjusted. Since the mechanical layout is simplified, the problem resulted from the mechanical inertial properties of using the motor to adjust the optical parameters will be eliminated.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical device, comprising:
    a lens module;
    a case structure partially sheltering said lens module; and
    an optical adjusting mechanism comprising:
        a first adjusting member disposed on said lens module, and comprising a first interference transmission structure;
        a second adjusting member movably connected with said case structure, and comprising a second interference transmission structure; and
        an elastic element arranged between said case structure and said second adjusting member, wherein in response to a movement of said lens module, said elastic element elastically urges against said second adjusting member so that said second adjusting member is movable within a predetermined distance range, and said second interference transmission structure of said second adjusting member presses against and engages with said first interference transmission structure of said first adjusting member, wherein once said second adjusting member is moved, said first adjusting member is synchronously moved so that optical parameters of said lens module are adjusted through the first adjusting member.

2. The optical device according to claim 1, wherein said first adjusting member further comprises:
    a first lens-fixing ring, wherein said first interference transmission structure is slightly protruded out of said first lens-fixing ring; and
    a second lens-fixing ring connected with said first lens-fixing ring, wherein said lens module is partially clamped between said first lens-fixing ring and said second lens-fixing ring, wherein upon rotation of said first lens-fixing ring and said second lens-fixing ring, said optical parameters of said lens module are correspondingly adjusted.

3. The optical device according to claim 1, wherein said second adjusting member of said optical adjusting mechanism further comprises an auxiliary fixing element, wherein said auxiliary fixing element comprises a slab and shaft, said shaft is substantially arranged in a middle of said slab, and said second interference transmission structure is sheathed around said shaft.

4. The optical device according to claim 3, wherein said elastic element of said optical adjusting mechanism has a first terminal and a second terminal, which are opposed to each other, wherein said first terminal is in contact with said case structure, and said second terminal is in contact with said auxiliary fixing element of said second adjusting member.

5. The optical device according to claim 4, wherein said auxiliary fixing element of said second adjusting member further comprises an extension part, which is extended from an end of said slab, wherein said second terminal of said elastic element is in contact with said extension part.

6. The optical device according to claim 5, wherein said case structure further comprises a post extended toward said lens module, and said extension part of said auxiliary fixing element further comprises an opening aligned with said post.

7. The optical device according to claim 6, wherein a fastening element is penetrated through said opening of said extension part of said auxiliary fixing element and tightened in said post so that said second adjusting member is movably connected with said case structure.

8. The optical device according to claim 7, wherein said elastic element of said optical adjusting mechanism is a helical spring with a channel, and said post of said case structure is inserted into and accommodated within said channel.

9. The optical device according to claim 3, wherein said case structure further comprises a partition plate, and said slab of said auxiliary fixing element presses against said partition plate so that a shift of said second adjusting member along an axial direction of said lens module is limited by said partition plate.

10. The optical device according to claim 1, wherein said case structure further comprises an operating space with a slot, and said second interference transmission structure of said second adjusting member is partially penetrated through said slot and accommodated within said operating space.

11. The optical device according to claim 1, wherein said first interference transmission structure of said first adjusting member is a rack, and said second interference transmission structure of said second adjusting member is a gear.

12. The optical device according to claim 11, wherein the width of said rack is greater than the width of said gear.

13. The optical device according to claim 11, wherein the tooth pitch of said rack is slightly greater than the tooth thickness of said gear.

14. The optical device according to claim 1, wherein said optical device is an ultra-short focus projector.

15. An optical adjusting mechanism of an optical device, said optical device comprising a case structure and a lens module, said case structure partially sheltering said lens module, said optical adjusting mechanism comprising:
    a first adjusting member disposed on said lens module, and comprising a first interference transmission structure;
    a second adjusting member movably connected with said case structure, and comprising a second interference transmission structure; and
    an elastic element arranged between said case structure and said second adjusting member, wherein in response to a movement of said lens module, said elastic element elastically urges against said second adjusting member so that said second adjusting member is movable within a predetermined distance range, and said second interference transmission structure of said second adjusting member presses against and engages with said first interference transmission structure of said first adjusting member, wherein once said second adjusting member is moved, said first adjusting member is synchronously moved so that optical parameters of said lens module are adjusted through the first adjusting member.

16. The optical adjusting mechanism according to claim 15, wherein said first adjusting member further comprises:
a first lens-fixing ring, wherein said first interference transmission structure is slightly protruded out of said first lens-fixing ring; and
a second lens-fixing ring connected with said first lens-fixing ring, wherein said lens module is partially clamped between said first lens-fixing ring and said second lens-fixing ring, wherein upon rotation of said first lens-fixing ring and said second lens-fixing ring, said optical parameters of said lens module are correspondingly adjusted.

17. The optical adjusting mechanism according to claim 16, wherein said second adjusting member further comprises an auxiliary fixing element, and said auxiliary fixing element comprises:
a slab;
a shaft substantially arranged in a middle of said slab, wherein said second interference transmission structure is sheathed around said shaft; and
an extension part extended from an end of said slab, and comprising an opening.

18. The optical adjusting mechanism according to claim 17, wherein said case structure further comprises a post extended toward said lens module, and said post is aligned with said opening of said extension part of said auxiliary fixing element, wherein a fastening element is penetrated through said opening of said extension part of said auxiliary fixing element and tightened in said post so that said second adjusting member is movably connected with said case structure.

19. The optical adjusting mechanism according to claim 18, wherein said elastic element of said optical adjusting mechanism is a helical spring with a first terminal, a second terminal and a channel, wherein said first terminal is in contact with said case structure, said second terminal is in contact with said auxiliary fixing element of said second adjusting member, and said post of said case structure is inserted into and accommodated within said channel.

* * * * *